No. 888,010. PATENTED MAY 19, 1908.
J. HANON.
SPOKE SETTER AND GUIDE.
APPLICATION FILED DEC. 28, 1906.
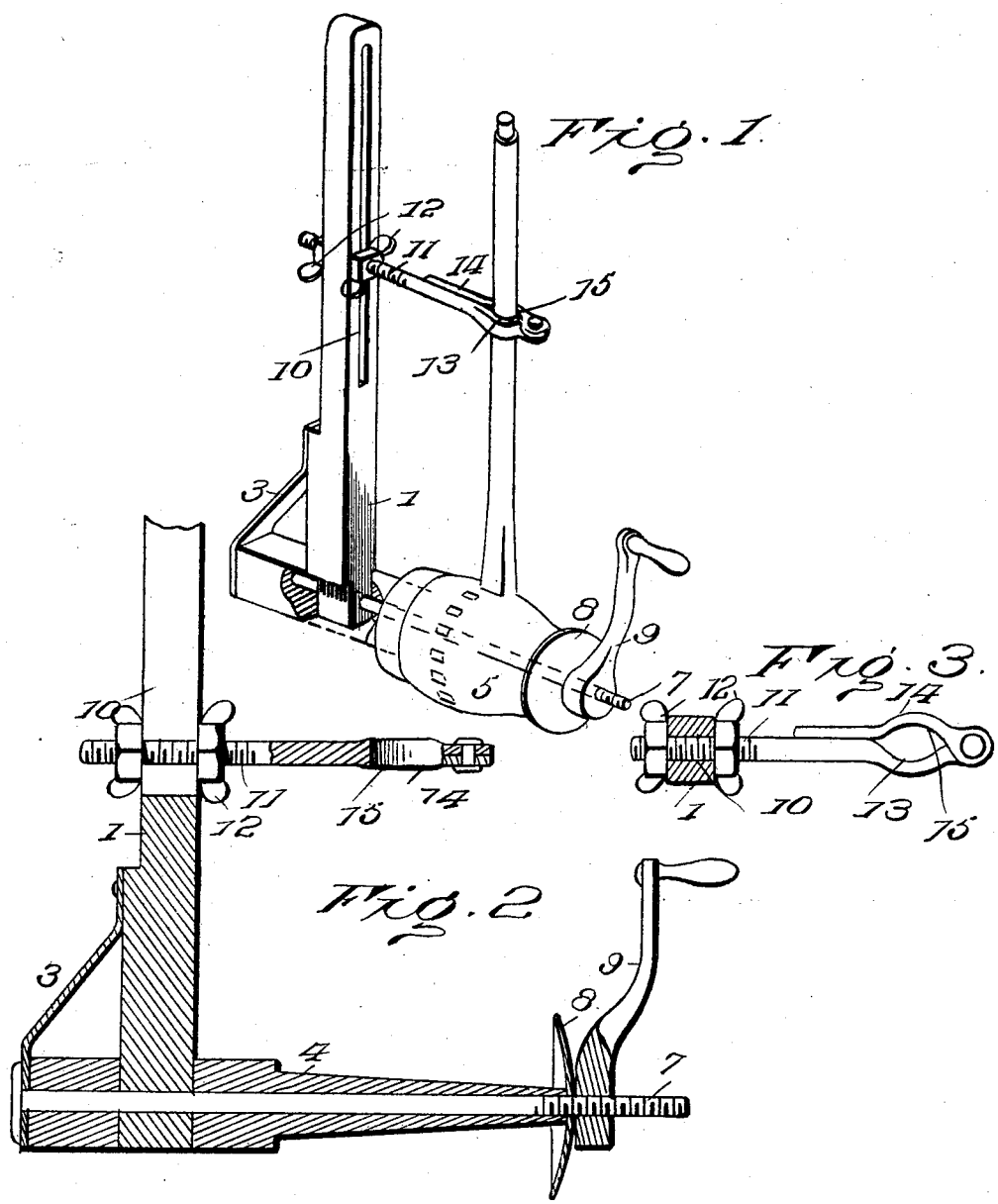

UNITED STATES PATENT OFFICE.

JOSEPHUS HANON, OF NEAR DEARBORN, MISSOURI.

SPOKE SETTER AND GUIDE.

No. 888,010.

Specification of Letters Patent.

Patented May 19, 1908.

Application filed December 28, 1906. Serial No. 349,890.

*To all whom it may concern:*

Be it known that I, JOSEPHUS HANON, citizen of the United States, residing near Dearborn, in the county of Buchanan and State of Missouri, have invented certain new and useful Improvements in Spoke Setters and Guides, of which the following is a specification.

This invention provides novel means for holding a hub and spokes in the construction of a wheel and when assembling the parts, the purpose being to insure accurate position of the spokes with reference to the dish and the distance of the outer ends of the spokes from the hub, thereby facilitating the placing of the rim in position after the spokes have been set into the hub.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a device embodying the invention. Fig. 2 is a vertical central section thereof. Fig. 3 is a horizontal section bringing out more clearly the spoke grip.

Corresponding and like parts are referred to in the following description and indicated in all the views of the drawings by the same reference characters.

The device comprises a frame-work which consists of a bar 1 and a cross-head, the latter being secured at an intermediate point to an end of the bar 1 in any substantial manner as by means of a mortise and tenon joint. A brace 3 connects one end of the cross-head with the bar. A spindle 4 projects from the opposite end of the cross-head in line therewith and is tapered and adapted to receive the hub 5 into which the spokes 6 are to be set. The brace 3 is arranged on that side of the bar opposite the side from which the spindle 4 projects so as to sustain the weight and the force of the blows delivered upon the ends of the spokes to drive the same into the hub. A rod 7 passes through the spindle 4 and cross-head 2 and one end is headed to overlap the brace 3 and secure the same to the cross-head, the opposite end of the rod projecting beyond the spindle and being threaded to receive a washer 8 and a hand-nut 9. In the preferable construction, the bar 1, cross-head 2 and spindle 4 are of wood, hence the advantage of providing the rod 7 which serves to clamp the hub 5 upon the spindle, and at the same time provides connecting means between the bar 1 and cross-head, since it passes through the tenon of the bar fitted into the mortise of the cross-head.

The spoke grip is adjustable on the bar 1 and for this purpose, said bar is provided with a slot 10 through which the threaded end of the member 11 of the spoke grip passes, a pair of winged nuts 12 being mounted upon the threaded portion of the member 11 and having the bar 1 between them, and by proper manipulation of the nuts 12, the spoke grip may be adjusted according to the nature of the work so as to properly position each of the spokes with reference to the hub. By loosening one of the nuts 12, the spoke grip may be moved along the bar 1 according to the length of the spoke. The member 11 is provided near its outer end with a depression 13 which forms a seat to receive the spokes. After the spoke grip has been secured, the member 11 is fixed. The companion member 14 of the spoke grip is pivoted to the outer end of the member 11 and is formed with a depression 15 similar to the depression 13 and when the pivoted member 14 is closed upon the fixed member 11, the depressions 13 and 15 unitedly form an opening through which the spoke projects.

In the application of the spoke setter and guide, the hub 5 to which the spokes are to be attached is slipped upon the spindle 4 and clamped thereon by means of the washer 8 and hand-nut 9, the latter being turned so as to cause the washer 8 to bear against the outer end of the hub. The spokes 6 are then inserted within the sockets in the hub one at a time and placed in engagement with the spoke grip carried by the bar 1. The various spokes can then be securely driven in position by delivering blows upon the outer ends of the same. In this connection it is desired to call attention to the fact that no support is required for the device, the hub being placed directly upon the floor or ground while driving the first spokes and the spokes at the bottom of the hub serving as a support for the device while driving the upper spokes.

If found desirable portions of the felly can be applied to the lower spokes so as to hold the same together and form a firm support for the device.

One important feature of the invention resides in the fact that the device is very light in construction and can be readily manipulated by hand without requiring any special form of support.

Having thus described the invention, what is claimed as new is:

1. In a spoke setter and guide, the combination of a cross head having a spindle projecting from one end thereof in alinement therewith, a bar disposed transversely with respect to the cross head and engaging the same at an intermediate point, a spoke guide mounted upon the bar in coöperative relation to the spindle, a diagonal brace between one end of the cross head and the bar, a rod extending through the cross head and spindle and securing the diagonal brace to the cross head and also serving to secure the bar to the cross head, and a nut operating upon the end of the rod for clamping a hub upon the spindle.

2. In a spoke setter and guide, the combination of a cross head having a spindle projecting from one end thereof in alinement therewith, a bar disposed transversely with respect to the cross head and having one end thereof mortised into an intermediate portion of the cross head, a spoke guide mounted upon the bar in coöperative relation to the spindle, a diagonal brace between one end of the cross head and the bar, a rod extending through the cross head and spindle, the said rod passing through the mortise of the bar and also securing the diagonal brace to the cross head, and a nut operating upon the end of the rod for clamping a hub upon the spindle.

In testimony whereof I affix my signature in presence of two witnesses.

JOSEPHUS HANON.

Witnesses:
  T. J. MEANS, Jr.,
  S. C. STAFFORD.